United States Patent
Ramappan et al.

(10) Patent No.: US 8,381,700 B2
(45) Date of Patent: Feb. 26, 2013

(54) SYSTEMS AND METHODS FOR EXHAUST GAS RECIRCULATION CONTROL IN HOMOGENEOUS CHARGE COMPRESSION IGNITION ENGINE SYSTEMS

(75) Inventors: Vijay Ramappan, Novi, MI (US); Allen B. Rayl, Waterford, MI (US)

(73) Assignee: GM Global Technology Operations LLC

( * ) Notice: Subject to any disclaimer, the term of this patent is extended or adjusted under 35 U.S.C. 154(b) by 726 days.

(21) Appl. No.: 12/629,959

(22) Filed: Dec. 3, 2009

(65) Prior Publication Data

US 2011/0132316 A1    Jun. 9, 2011

(51) Int. Cl.
*F02M 25/07* (2006.01)
*F02B 17/00* (2006.01)
*F02B 47/08* (2006.01)

(52) U.S. Cl. .................................. 123/295; 123/568.21

(58) Field of Classification Search .................. 123/295, 123/568.21–568.28
See application file for complete search history.

(56) References Cited

U.S. PATENT DOCUMENTS

| | | | |
|---|---|---|---|
| 6,964,256 B2 * | 11/2005 | Kataoka et al. | 123/295 |
| 2005/0228573 A1 * | 10/2005 | Gangopadhyay | 701/108 |
| 2008/0066713 A1 * | 3/2008 | Megli et al. | 123/295 |
| 2011/0016850 A1 * | 1/2011 | Shibata et al. | 60/285 |
| 2011/0023847 A1 * | 2/2011 | Gates et al. | 123/568.21 |
| 2011/0079193 A1 * | 4/2011 | Shibata et al. | 123/295 |

* cited by examiner

*Primary Examiner* — Stephen K Cronin
*Assistant Examiner* — Arnold Castro

(57) ABSTRACT

An engine control system for a homogeneous charge compression ignition (HCCI) engine includes a position determination module, a position correction module, and a valve control module. The position determination module determines an initial position of an exhaust gas recirculation (EGR) valve based on a predetermined function of a desired EGR flow, intake manifold pressure, exhaust manifold pressure, and exhaust gas temperature. The position correction module determines a position correction for the EGR valve based on pressure in a cylinder of the HCCI engine. The valve control module commands the EGR valve to the initial position during a transition from spark ignition (SI) combustion to HCCI combustion, and commands the EGR valve to a final position within a predetermined period after the transition, wherein the final position includes a sum of the initial position and the position correction.

20 Claims, 3 Drawing Sheets

SYSTEMS AND METHODS FOR EXHAUST GAS RECIRCULATION CONTROL IN HOMOGENEOUS CHARGE COMPRESSION IGNITION ENGINE SYSTEMS

FIELD

The present disclosure relates to internal combustion engines and more particularly to systems and methods for controlling exhaust gas recirculation (EGR) in homogeneous charge compression ignition (HCCI) engine systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Homogeneous charge compression ignition (HCCI) engines combust an air/fuel (NF) mixture within cylinders to produce drive torque. For example, in an HCCI combustion mode the A/F mixture may be automatically ignited when compressed by pistons (i.e. compression ignition). Alternatively, for example, in a spark ignition (SI) combustion mode the A/F mixture may be ignited by spark plugs in the cylinders after the pistons compress the A/F mixture. Moreover, there are transitions states between the combustion modes (e.g., transitioning from SI to HCCI).

The HCCI combustion mode may increase engine efficiency and/or fuel economy compared to the SI combustion mode. However, the HCCI combustion mode may be limited to a predetermined HCCI operating zone in order to reduce combustion noise and protect the engine from damage due to excessive pressure increases associated with HCCI. Therefore, pressure sensors may be implemented in one or more of the cylinders and may be used to monitor cylinder pressure, particularly during the HCCI combustion mode.

However, the HCCI combustion mode may also require precise control of A/F ratio, fuel injection timing, and other engine operating parameters to prevent decreased fuel efficiency and/or increased emissions. More specifically, lower peak temperatures during combustion (compared to SI combustion mode) may lead to incomplete burning of fuel and thus decreased fuel efficiency. Furthermore, nitrogen oxide (NOx) emissions may be higher during the HCCI combustion mode than in the SI combustion mode due to leaner A/F mixtures used in the HCCI combustion mode.

SUMMARY

An engine control system for a homogeneous charge compression ignition (HCCI) engine includes a position determination module, a position correction module, and a valve control module. The position determination module determines an initial position of an exhaust gas recirculation (EGR) valve based on a predetermined function of a desired EGR flow, intake manifold pressure, exhaust manifold pressure, and exhaust gas temperature. The position correction module determines a position correction for the EGR valve based on pressure in a cylinder of the HCCI engine. The valve control module commands the EGR valve to the initial position during a transition from spark ignition (SI) combustion to HCCI combustion, and commands the EGR valve to a final position within a predetermined period after the transition, wherein the final position includes a sum of the initial position and the position correction.

A method includes determining an initial position of an exhaust gas recirculation (EGR) valve based on a predetermined function of a desired EGR flow, intake manifold pressure, exhaust manifold pressure, and exhaust gas temperature, determining a position correction for the EGR valve based on pressure in a cylinder of a homogeneous charge compression ignition (HCCI) engine, commanding the EGR valve to the initial position during a transition from spark ignition (SI) combustion to HCCI combustion, and commanding the EGR valve to a final position within a predetermined period after the transition, wherein the final position includes a sum of the initial position and the position correction.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
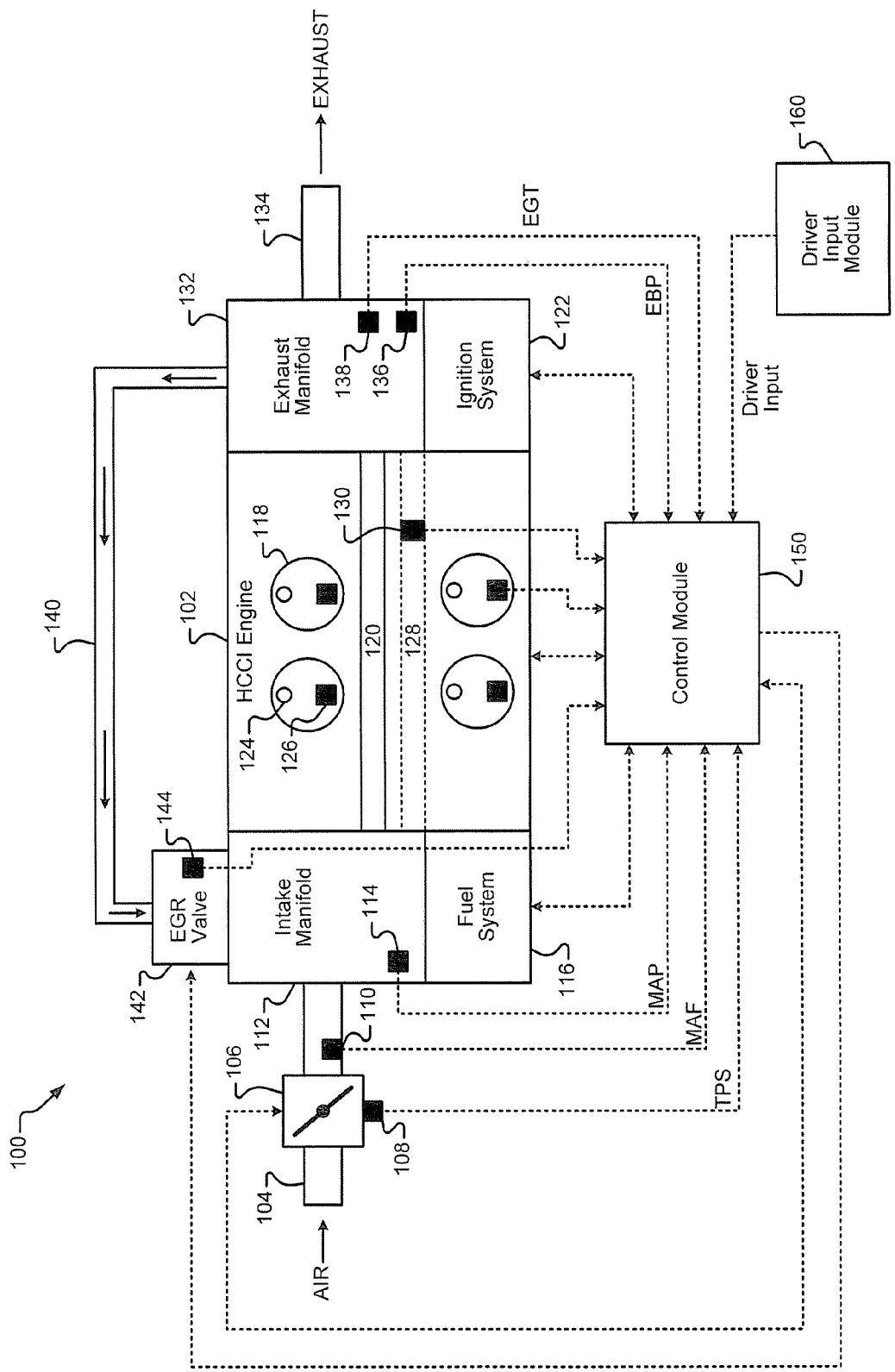
FIG. 1 is a functional block diagram of an exemplary homogeneous charge compression ignition (HCCI) engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Exhaust gas recirculation (EGR) systems may be implemented in a homogeneous charge compression ignition (HCCI) engine to increase fuel efficiency, reduce HCCI combustion noise, and/or decrease emissions. Typical engine control systems actuate a valve of the EGR system (an EGR valve) to control an amount (i.e. a percentage) of exhaust gas that is recirculated back into an intake manifold. However, typical HCCI engine control systems actuate the EGR valve based on closed-loop feedback from pressure sensors in cylinders of the HCCI engine. More specifically, when a combustion heat release rate is greater than a desired threshold, the engine control system may actuate the EGR valve to increase an amount of EGR and retard the combustion rate.

However, during transitions from a spark ignition (SI) combustion mode to an HCCI combustion mode, EGR flow may not be available for the HCCI combustion event due to "transport delay" involved in direction a portion of the exhaust flow back into respective intake valves of cylinders. In other words, the SI combustion mode may maintain the EGR valve in near-closed range of positions (e.g., 5 to 15%), whereas the HCCI combustion mode may require a much larger amount of EGR (e.g., up to 50%). Therefore, fuel efficiency may decrease, emissions may increase, and/or combustion noise may increase due to the "transport delay" during the transition from the SI combustion mode to the HCCI combustion mode.

Thus, systems and methods are presented that compensate for the "transport delay" during combustion mode transitions (i.e. SI to HCCI transitions). More specifically, the systems and methods presented command the EGR valve to an initial position during the combustion mode transition based on open-loop control (i.e. no feedback). The systems and methods presented may then adjust the position of the EGR valve after combustion mode transition based on closed-loop control (i.e. feedback from cylinder pressure sensors). The earlier opening of the EGR valve during the combustion mode transition may result in increased fuel efficiency, decreased combustion noise, and/or decreased emissions. Additionally or alternatively, the system and method may feed-forward EGR valve position and may feedback EGR valve position correction (similar to that described above) during transitions between various engine speeds and/or engine loads while operating in the HCCI combustion mode.

Referring now to FIG. 1, an exemplary implementation of an HCCI engine system 100 is shown. The HCCI engine system 100 includes an HCCI engine 102, an air inlet 104, a throttle 106, a throttle position sensor (TPS) sensor 108, a mass air flow (MAF) sensor 110, an intake manifold 112, and an intake manifold absolute pressure (MAP) sensor 114.

Air is drawn into the HCCI engine 102 into the intake manifold 112 through the air inlet 104 that is regulated by the throttle 106. The TPS sensor 108 may generate a TPS signal based on a relative position of the throttle 106. The MAF sensor 110 may generate a MAF signal based on a mass air flow into the HCCI engine 102. For example, an engine load may be determined based on the signal from the MAF sensor 110. The MAP sensor 114 may generate a MAP signal based on a pressure inside the intake manifold 112.

The HCCI engine system 100 further includes a fuel system 116, a plurality of cylinders 118, a camshaft 120, an ignition system 122, a plurality of spark plugs 124, a plurality of cylinder pressure sensors 126, a crankshaft 128, and a crankshaft sensor 130.

Air inside the intake manifold 112 may be distributed to the plurality of cylinders 118. While four cylinders 118 are shown, it can be appreciated that the HCCI engine 102 may include other numbers of cylinders. The camshaft 120 actuates intake valves (not shown) that selectively open and close to enable the air from the intake manifold 112 to enter the cylinders 118. While one camshaft 120 is shown, it can be appreciated that more than one camshaft 120 may be implemented (e.g. dual overhead camshafts).

The fuel system 116 may inject fuel into the intake manifold 112 at a central location (i.e central port injection, or CPI) or may inject fuel into the intake manifold 112 at multiple locations (i.e. multi-port injection, or MPI). Alternatively, the fuel system 116 may inject fuel directly into the cylinders 118 (i.e. direct fuel injection). The air mixes with the injected fuel to form the A/F mixture in the cylinders 118. Cylinder pressure sensors 126 measure pressure inside the cylinders 118.

For example only, the HCCI engine 102 may switch from HCCI combustion mode to SI combustion mode when pressure in one or more of the cylinders 118 is greater than a predetermined threshold.

Pistons (not shown) within the cylinders 118 compress the A/F mixture. At low-to-medium engine loads and low-to-medium engine speeds, the HCCI engine system 100 is operating in HCCI combustion mode, and the A/F mixture is automatically ignited when compressed (i.e. compression ignition). Otherwise, the HCCI engine system 100 is operating in SI combustion mode, and the ignition system 122 may ignite the A/F mixture or provide spark assist during HCCI operation via the spark plugs 124. The combustion of the A/F mixture drives the pistons down, thereby rotatably driving the crankshaft 128 to produce the drive torque. The crankshaft sensor 130 may generate an engine speed signal based on a rotational speed (e.g. in revolutions per minute, or RPM) of the crankshaft 128.

The HCCI engine system 100 further includes an exhaust manifold 132, an exhaust outlet 134, an exhaust manifold back pressure (EBP) sensor 136, an exhaust gas temperature (EGT) sensor 138, an exhaust gas recirculation (EGR) line 140, an EGR valve 142, and an EGR valve position sensor 144.

As previously mentioned, the camshaft 120 also actuates exhaust valves (not shown) that selectively open and close to enable combustion exhaust from the cylinders 118 to enter the exhaust manifold 132. The exhaust gas may then be forced out of the engine system through the exhaust outlet 134. The EBP sensor 136 may measure pressure of the exhaust gas in the exhaust manifold 132. The EGT sensor 138 may measure temperature of the exhaust gas in the exhaust manifold 132 (and thus the temperature of the exhaust gas being recirculated by the EGR system 140, 142). Alternatively, it can be appreciated that temperature of the exhaust gas may be modeled based on various engine operating parameters.

The EGR line 140 and the EGR valve 142 may also introduce exhaust gas into the intake manifold 112. More specifically, the EGR line 140 extends from the exhaust manifold 132 to the EGR valve 142, and the EGR valve 142 may be mounted on the intake manifold 112 (as shown). Thus, the EGR valve 142 may selectively open and close to enable exhaust gas to enter the intake manifold 112. For example, recirculation of exhaust gas may lower peak combustion temperatures, and thus may decrease emissions, decrease combustion noise, and/or increase efficiency of the HCCI engine 102. The EGR position sensor 144 generates a signal indicating a position of the EGR valve (e.g., 0% to 100% EGR).

The control module 150 controls operation of the HCCI engine system 100 based on driver input and various engine operating parameters. More specifically, the control module 150 may receive driver input from a driver input module 160. For example only, the driver input module 160 may be an accelerator pedal and the driver input may correspond to a position (i.e. depression) of the accelerator pedal.

The control module 150 controls and communicates with the HCCI engine 102, the throttle 106 (e.g. via electronic throttle control, or ETC), the fuel system 116, the ignition system 122, the spark plugs 124, and the EGR valve 142. The control module 150 also receives signals from the TPS sensor 108, the MAF sensor 110, the MAP sensor 114, the cylinder pressure sensors 126, the crankshaft sensor 130, the EBP sensor 136, the EGT sensor 138, and the EGR position sensor 144.

Figure 2:
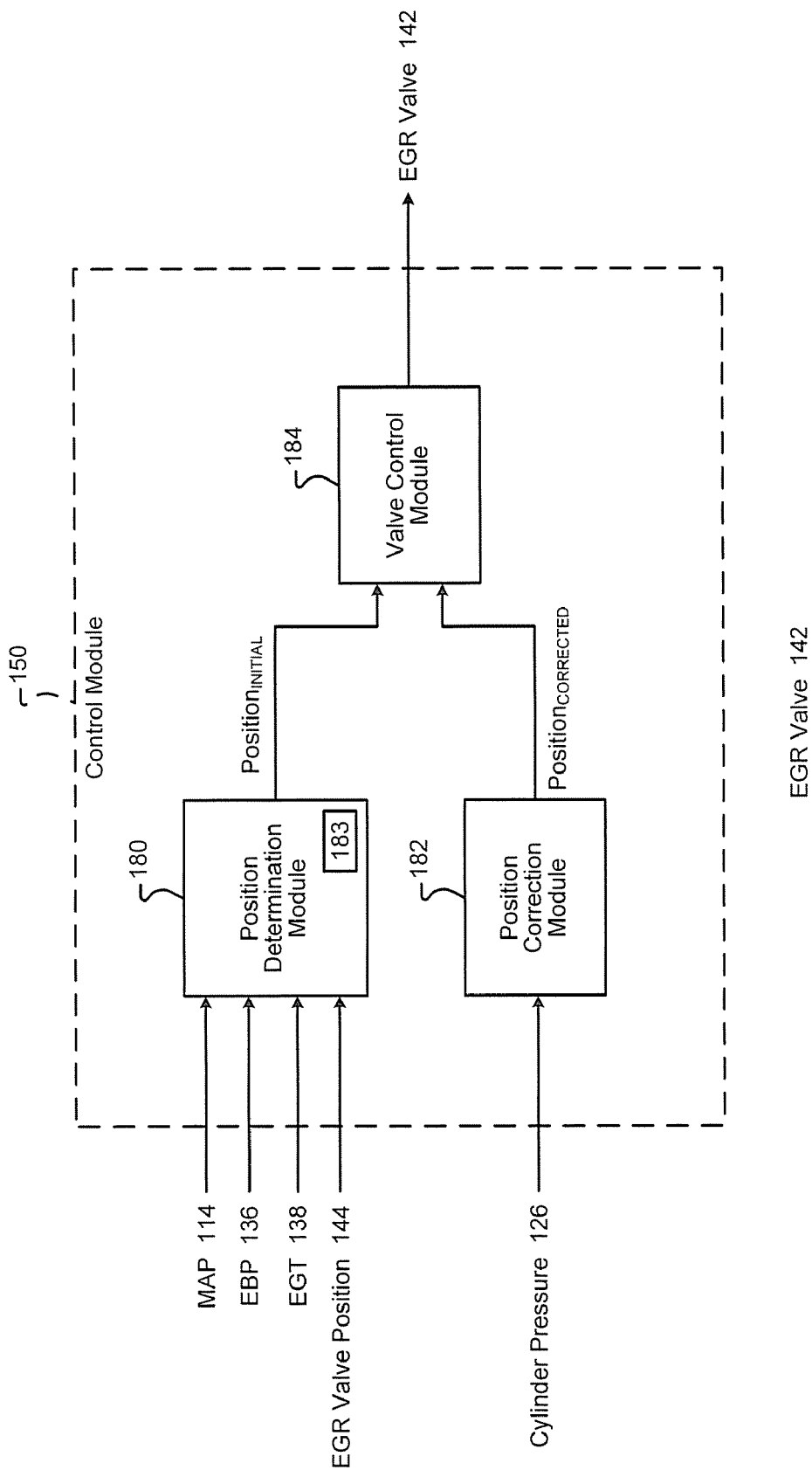
FIG. 2 is a functional block diagram of an exemplary control module according to the present disclosure.

Referring now to FIG. 2, the control module 150 is shown in more detail. The control module 150 may include a position determination module 180, a position correction module 182, and a valve control module 184.

The position determination module 180 may receive signals from the MAP sensor 114, the EBP sensor 136, the EGT sensor 138, and the EGR valve position sensor 144. The position determination module 180 may determine an initial position of the EGR valve 142 based on an EGR flow model that is a function of MAP, EBP, EGT, and desired EGR flow. Moreover, the EGR flow model may be based on physical flow characteristics of the EGR valve 142. The position determination module 182 may include a look-up table 183 that relates desired EGR flow to various engine operating points. For example only, the look-up table 183 may be calibrated using a dynamometer.

Thus, the position determination module 180 may determine the initial position of the EGR valve 142 based on open-loop control (i.e. no feedback). More specifically, the position determination module 180 may determine the initial position of the EGR valve 142 such that an optimal amount of exhaust gas may be recirculated. In other words, the optimal amount of EGR may correspond to increased fuel efficiency, decreased combustion noise, and/or decreased emissions while operating in the new combustion mode (i.e. the combustion mode after the transient period). For example only, EGR valve opening may decrease to maintain the desired EGR flow when EBP increases due to increased exhaust gas flow. Alternatively, for example only, EGR valve opening may increase to maintain the desired EGR flow when MAP increases due to increased intake flow. Similarly, for example only, EGR valve opening may increase to maintain the desired EGR flow when EGT increases due to thermal expansion of the exhaust gas (i.e. less exhaust gas flowing).

The position correction module 182 may receive signals from the pressure sensors 126 in the cylinders 118 of the HCCI engine 102. The position correction module 182 determines position correction for the EGR valve 142. In other words, the position correction module 182 may determine an amount of change in position of the EGR valve 142 based on closed-loop control (i.e. feedback from the pressure sensors 126). For example only, when combustion phasing (calculated based on cylinder pressure) is earlier than a predetermined threshold, the position of the EGR valve 142 may be increased (i.e. opened more) to retard combustion.

The valve control module 184 receives the initial position and the position correction from the position determination module 180 and the position correction module 182, respectively. The valve control module 184 first commands the EGR valve 142 to the initial position (determined by the position determination module 180) during a transient period. However, after the transient period, the valve control module 184 may then command the EGR valve 142 to a final position based on the position correction for the EGR valve 142 (determined by the position correction module 182). For example, the final position may include a sum of the initial position and the position correction. In other words, the valve control module 184 may adjust the EGR valve 142 based on closed-loop control (i.e. feedback from the pressure sensors 126). Thus, the valve control module 184 may optimize position of the EGR valve and thus may increase fuel efficiency, decrease combustion noise, and/or decrease emissions of the HCCI engine 102.

Figure 3:
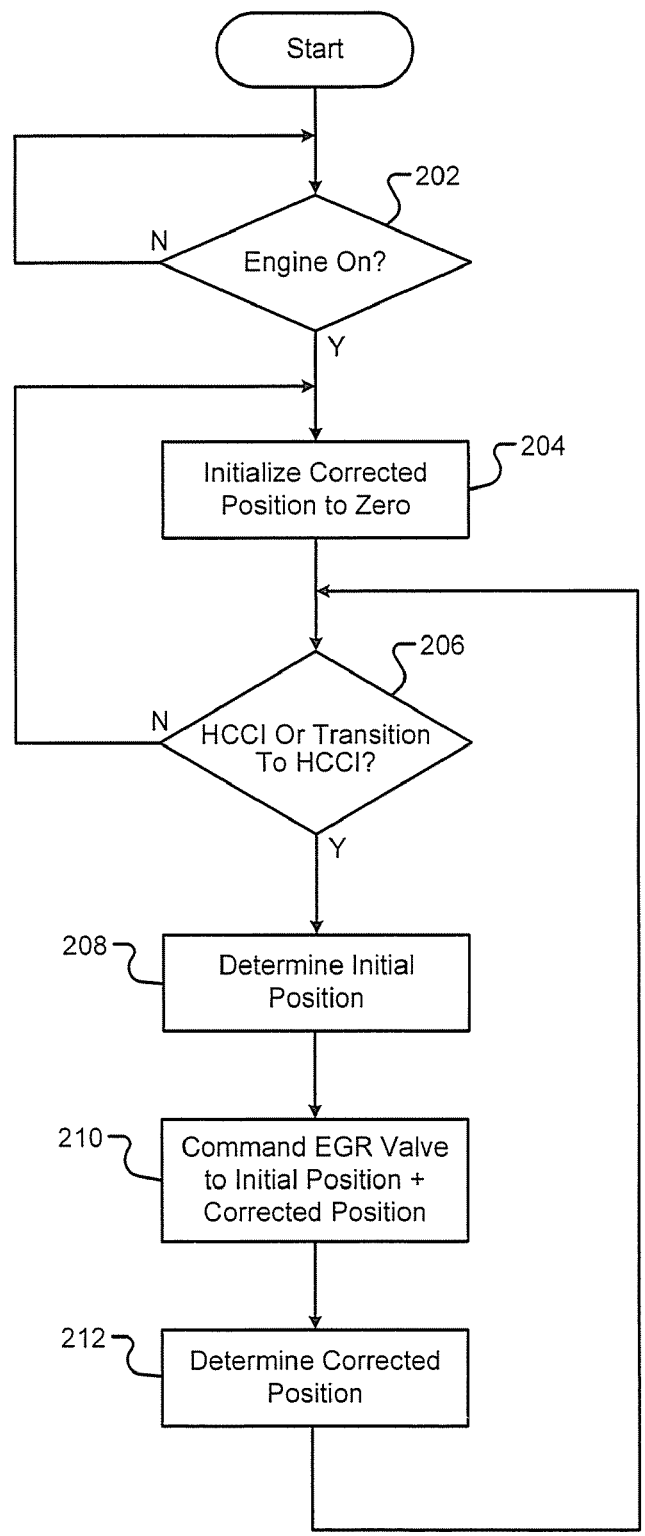
FIG. 3 is a flow diagram of a method for controlling an exhaust gas recirculation (EGR) system of an HCCI engine according to the present disclosure.

Referring now to FIG. 3, a method for controlling the EGR system begins in step 202. In step 202, the control module 150 determines whether the HCCI engine 102 is operating. If true, control may proceed to step 204. If false, control may return to step 202. In step 204, the control module initializes the corrected position of the EGR valve 142 to zero.

In step 206, the control module 150 determines whether the HCCI engine 102 is operating in HCCI combustion or is transitioning to HCCI combustion. For example only, the HCCI engine 102 may transition from the SI combustion mode to the HCCI combustion mode when vehicle operating conditions (i.e. engine RPM) are within the predefined HCCI operating zone. If true, control may proceed to step 208. If false, control may return to step 204.

In step 208, the control module 150 may determine the initial position of the EGR valve 142. For example, the initial position of the EGR valve 142 may be based on open-loop control. In step 210, the control module 150 may command the EGR valve 142 to a position corresponding to a sum of the initial position and the corrected position.

In step 212, the control module 150 may determine the corrected position of the EGR valve 142. For example, the corrected position of the EGR valve 142 may be based on closed-loop control using feedback from the pressure sensors 126. Control may then return to step 206.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system for a homogeneous charge compression ignition (HCCI) engine, comprising:
 a position determination module that determines an initial position of an exhaust gas recirculation (EGR) valve based on a predetermined function of a desired EGR flow, intake manifold pressure, exhaust manifold pressure, and exhaust gas temperature;
 a position correction module that determines a position correction for the EGR valve based on pressure in a cylinder of the HCCI engine; and
 a valve control module that commands the EGR valve to the initial position during a transition from spark ignition (SI) combustion to HCCI combustion, and that commands the EGR valve to a final position within a predetermined period after the transition, wherein the final position includes a sum of the initial position and the position correction.

2. The engine control system of claim 1, wherein the final position is greater than the initial position when combustion phasing of the HCCI engine is advanced to greater than a first predetermined threshold.

3. The engine control system of claim 1, wherein the final position is less than the initial position when combustion phasing of the HCCI engine is retarded to less than a second predetermined threshold.

4. The engine control system of claim 1, wherein the HCCI engine includes combustion phasing according to when half of an air/fuel (A/F) mixture in a cylinder has burned (CA50).

5. The engine control system of claim 1, wherein the predetermined function is calibrated using a dynamometer.

6. The engine control system of claim 1, wherein the predetermined function is based on flow characterizations of the EGR valve.

7. The engine control system of claim 1, wherein the predetermined function is optimized for at least one of fuel efficiency, engine stability, combustion noise, and emissions output by the HCCI engine.

8. The engine control system of claim 1, wherein the intake manifold pressure indicates pressure downstream from the EGR valve, wherein the intake manifold pressure is measured using an intake manifold absolute pressure (MAP) sensor, wherein the exhaust manifold pressure indicates pressure upstream from the EGR valve, and wherein the exhaust manifold pressure is one of measured using an exhaust manifold back pressure (EBP) sensor and estimated using a predetermined exhaust pressure model.

9. The engine control system of claim 1, wherein the exhaust temperature is one of measured using an exhaust gas temperature (EGT) sensor and estimated using a predetermined temperature model.

10. The engine control system of claim 1, further comprising:
a pressure sensor that measures pressure inside the cylinder of the HCCI engine.

11. A method includes:
determining an initial position of an exhaust gas recirculation (EGR) valve based on a predetermined function of a desired EGR flow, intake manifold pressure, exhaust manifold pressure, and exhaust gas temperature;
determining a position correction for the EGR valve based on pressure in a cylinder of a homogeneous charge compression ignition (HCCI) engine;
commanding the EGR valve to the initial position during a transition from spark ignition (SI) combustion to HCCI combustion; and
commanding the EGR valve to a final position within a predetermined period after the transition, wherein the final position includes a sum of the initial position and the position correction.

12. The method of claim 11, wherein the final position is greater than the initial position when combustion phasing of the HCCI engine is advanced to greater than a first predetermined threshold.

13. The method of claim 11, wherein the final position is less than the initial position when combustion phasing of the HCCI engine is retarded to less than a second predetermined threshold.

14. The method of claim 11, wherein the HCCI engine includes combustion phasing according to when half of an air/fuel (A/F) mixture in a cylinder has burned (CA50).

15. The method of claim 11, further comprising:
calibrating the predetermined function using a dynamometer.

16. The method of claim 11, wherein the predetermined function is based on flow characterizations of the EGR valve.

17. The method of claim 11, further comprising:
optimizing the predetermined function for at least one of fuel efficiency, engine stability, combustion noise, and emissions output by the HCCI engine.

18. The method of claim 11, further comprising:
measuring the intake manifold pressure using an intake manifold absolute pressure (MAP) sensor, wherein the intake manifold pressure indicates pressure downstream from the EGR valve; and
one of measuring the exhaust manifold pressure using an exhaust manifold back pressure (EBP) sensor and estimating the exhaust manifold pressure using a predetermined exhaust pressure model, wherein the exhaust manifold pressure indicates pressure upstream from the EGR valve.

19. The method of claim 11, further comprising:
one of measuring the exhaust gas temperature using an exhaust gas temperature (EGT) sensor and estimating the exhaust gas temperature using a predetermined temperature model.

20. The method of claim 11, further comprising:
measuring a pressure inside the cylinder of the HCCI engine using a pressure sensor.

\* \* \* \* \*